(12) United States Patent
Childers et al.

(10) Patent No.: US 12,007,608 B2
(45) Date of Patent: *Jun. 11, 2024

(54) MULTI-FIBER FERRULE WITH IMPROVED EYE SAFETY

(71) Applicant: US Conec Ltd., Hickory, NC (US)

(72) Inventors: Darrell R. Childers, Hickory, NC (US); Michael E. Hughes, Hickory, NC (US); Daniel D. Kurtz, Huntersville, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/183,831

(22) Filed: Mar. 14, 2023

(65) Prior Publication Data

US 2023/0213708 A1     Jul. 6, 2023

Related U.S. Application Data

(63) Continuation of application No. 17/116,850, filed on Dec. 9, 2020, now Pat. No. 11,614,588, which is a continuation of application No. 16/263,591, filed on Jan. 31, 2019, now Pat. No. 10,877,222, which is a continuation of application No. 15/162,089, filed on May 23, 2016, now Pat. No. 10,197,743.

(60) Provisional application No. 62/165,768, filed on May 22, 2015.

(51) Int. Cl.
| | |
|---|---|
| *G02B 6/36* | (2006.01) |
| *G02B 6/38* | (2006.01) |
| *G02B 6/42* | (2006.01) |

(52) U.S. Cl.
CPC ......... *G02B 6/3853* (2013.01); *G02B 6/3825* (2013.01); *G02B 6/3885* (2013.01); *G02B 2006/4297* (2013.01)

(58) Field of Classification Search
CPC .. G02B 6/3853; G02B 6/3885; G02B 6/3825; G02B 6/36; G02B 2006/4297
See application file for complete search history.

(56) References Cited

U.S. PATENT DOCUMENTS

| | | | |
|---|---|---|---|
| 5,815,621 A | 9/1998 | Sakai et al. | |
| 7,891,885 B2 | 2/2011 | Ariga et al. | |
| 8,985,865 B2* | 3/2015 | Howard | G02B 6/4212 385/79 |
| 9,360,632 B2 | 6/2016 | Arao et al. | |
| 9,529,155 B2 | 12/2016 | Bhagavatula et al. | |
| 9,551,835 B2 | 1/2017 | Sasaki et al. | |
| 9,575,268 B2 | 2/2017 | Wang et al. | |
| 10,162,127 B2 | 12/2018 | Bushnell et al. | |

(Continued)

FOREIGN PATENT DOCUMENTS

| | | |
|---|---|---|
| JP | 2016057540 A | 4/2016 |
| JP | 2016061942 A | 4/2016 |
| JP | 2016095410 A | 5/2016 |

*Primary Examiner* — Jennifer Doan
(74) *Attorney, Agent, or Firm* — Michael L Leetzow PLLC; Shubhrangshu Sengupta

(57) ABSTRACT

A multi-fiber ferrule has lenses that have different prescriptions to disperse the light emitted from the multi-fiber ferrule. Alternatively, the lens for each individual optical fiber can be moved relative to the optical fiber or the optical fiber opening in the multi-fiber ferrule to cause the laser beam exiting the multi-fiber ferrule to be redirected into a structure that absorbs or blocks the laser.

16 Claims, 13 Drawing Sheets

(56) References Cited

U.S. PATENT DOCUMENTS

| | | | |
|---|---|---|---|
| 10,197,743 B2* | 2/2019 | Childers | G02B 6/3825 |
| 10,877,222 B2* | 12/2020 | Childers | G02B 6/3885 |
| 11,614,588 B2* | 3/2023 | Childers | G02B 6/3853 |
| | | | 385/79 |
| 2009/0154884 A1 | 6/2009 | Chen et al. | |
| 2012/0177327 A1 | 7/2012 | Demeritt et al. | |
| 2013/0230280 A1 | 9/2013 | Kadar-Kallen et al. | |
| 2014/0064667 A1 | 3/2014 | Isenhour et al. | |
| 2015/0219863 A1 | 8/2015 | Haase et al. | |
| 2015/0362686 A1 | 12/2015 | Wang et al. | |
| 2016/0077284 A1 | 3/2016 | Arao et al. | |
| 2016/0139339 A1 | 5/2016 | Sasaki et al. | |
| 2016/0231513 A1 | 8/2016 | Butler et al. | |
| 2016/0259132 A1 | 9/2016 | Ling et al. | |
| 2016/0320569 A1 | 11/2016 | Fortusini et al. | |
| 2017/0023747 A1 | 1/2017 | Zbinden | |
| 2021/0149127 A1* | 5/2021 | Kurtz | G02B 6/4292 |

* cited by examiner

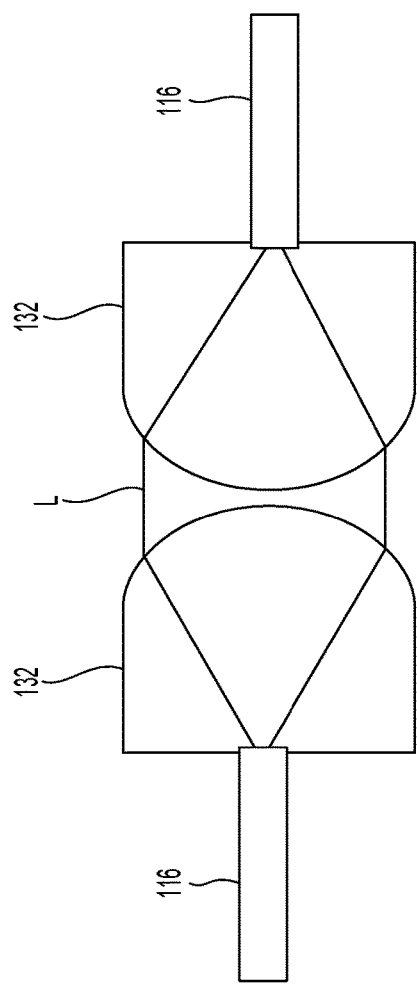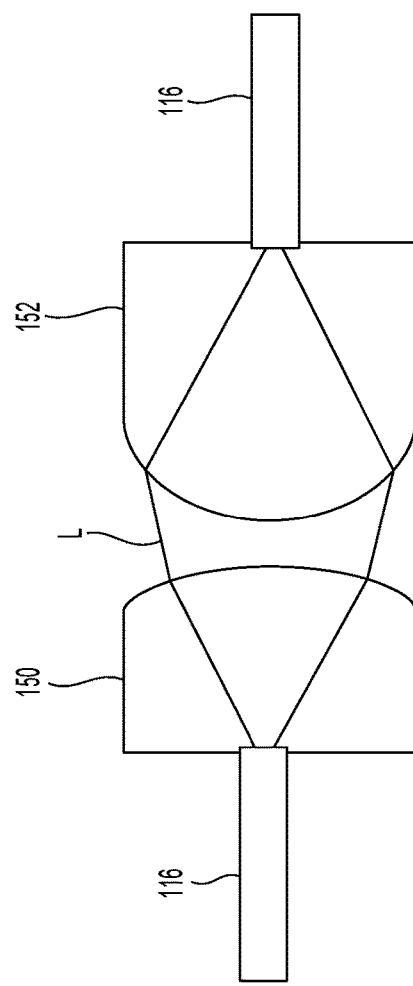

MULTI-FIBER FERRULE WITH IMPROVED EYE SAFETY

REFERENCE TO RELATED CASE

This application claims priority under 35 U.S.C. § 119 (e) to provisional application No. 62/165,768 filed on May 22, 2015, and under 35 U.S.C. § 120 to U.S. patent application Ser. No. 15/162,089, filed on May 23, 2016, and to U.S. patent application Ser. No. 16/263,591, filed on Jan. 31, 2019, and to U.S. patent application Ser. No. 17/116,850, filed on Dec. 9, 2020, the contents of which are hereby incorporated by reference in their entirety.

BACKGROUND OF THE INVENTION

Field of the Invention

The current Prizm® MT ferrule produced by Applicant US Conec uses a highly collimated laser beam. The laser beam is approximately 180 microns in diameter. The current Prizm MT ferrule contains up to 64 fibers in one multi-fiber ferrule. The collimated beam, the small size of the collimated beam and the number of fibers present a number of concerns regarding eye safety.

There two eye safety standards from the International Electrotechnical Commission (IEC). The first is 60825-1, which is for the classification of a laser product. The second is 60825-2, used to determine the hazard level from an optical fiber communication system during the event such as a fiber break. The most stringent condition of the 2 standards should apply to determine the radiation hazard and human safety.

In order to comply with these standards, the fiber optic industry has sometimes used mechanical shutters to either block the collimated or diverging laser beams exiting the multi-fiber ferrule to mitigate the risk to a user's eye. The mechanical shutters add cost and require additional space in an already very small space. Sometimes electrical shutters are also used to prevent a significant amount of light from exiting from the connector unless both ends are plugged in. Instead of using either electrical or mechanical shutters, the present invention resolved the eye safety concerns optically, using the features of the multi-fiber ferrule to prevent the collimated laser beam from entering a person's eyes or at least reducing the amount of light that can possibly enter the light at any given time.

SUMMARY OF THE INVENTION

The present invention is directed to a multi-fiber ferrule that includes a unitary main body having a front end, a back end, and a middle portion disposed between the front end and back end, first opening adjacent the back end of the unitary main body, the first opening configured to receive at least two optical fibers, a plurality of optical fiber openings extending from the first opening toward the front end, each of the plurality of optical fiber openings configured to receive an optical fiber, and a plurality of lenses disposed adjacent the front end in at least one rows and a plurality of columns, each of the plurality of lenses being in optical alignment with a respective one of the optical fiber openings, the lenses in each column having a different prescription from the lenses in each adjacent column.

In some embodiments, the columns of lenses comprise a first plurality of columns and a second plurality of columns, the lenses in the first plurality of columns have a first prescription and the lenses in the second plurality of columns having a second prescription.

According to another aspect of the present invention, a multi-fiber ferrule includes a unitary main body having a front end, a back end, and a middle portion disposed between the front end and back end, a first opening adjacent the back end of the unitary main body, the first opening configured to receive at least two optical fibers, a plurality of optical fiber openings extending from the first opening toward the front end, each of the plurality of optical fiber openings configured to receive an optical fiber and having an opening axis extending longitudinally therethrough, and a plurality of lenses disposed adjacent the front end, each of the plurality of lenses being in optical alignment with a respective one of the optical fiber openings, each of the plurality of lenses having an optical axis, the optical axis of each of the plurality of lenses being parallel to but offset from the opening axis of a respective optical fiber opening.

In some embodiments, the light passing through each of the plurality of lenses from an optical fiber disposed within the optical fiber openings exits the plurality of lenses at an angle of between 10 and 30 degrees relative to the opening and optical axes.

In other embodiments, the multi-fiber ferrule has a longitudinal axis extending therethrough between the front and back end and the light passing through each of the plurality of lenses from an optical fiber disposed within the optical fiber openings exits the plurality of lenses at an angle of at least 3.6 degrees radially outward relative to the longitudinal axis of the multi-fiber ferrule.

According to yet another aspect of the present invention, a fiber optic connector includes a connector housing having a front end, a back end, an inside surface extending between the front and back ends defining an opening in the connector housing, a multi-fiber ferrule configured to be inserted into the opening of the connector housing, the multi-fiber ferrule including a unitary main body having a front end, a back end, and a middle portion disposed between the front end and back end, a first opening adjacent the back end of the unitary main body, the first opening configured to receive at least two optical fibers, a plurality of optical fiber openings extending from the first opening toward the front end, each of the plurality of optical fiber openings configured to receive an optical fiber and having an opening axis extending longitudinally therethrough, and a plurality of lenses disposed adjacent the front end, each of the plurality of lenses being in optical alignment with a respective one of the optical fiber openings, each of the plurality of lenses having an optical axis, the optical axis of each of the plurality of lenses being parallel to but offset from the opening axis of a respective optical fiber opening such that light passing through each of the plurality of lenses from an optical fiber disposed within the optical fiber openings exits the plurality of lenses directed to the inside surface of the connector housing.

In some embodiments, the fiber optic connector also includes light absorbing material attached within the opening of the connector housing between the front end of the connector housing and the front end of the multi-fiber ferrule.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and, together with the description, serve to explain the principles and operations of the invention.

BRIEF DESCRIPTION OF THE DRAWINGS

FIG. 3 is a schematic diagram of the effect of the lenses on the laser beam leaving one multi-fiber ferrule and entering another;

FIG. 4 is a schematic diagram of a lens in a standard multi-fiber ferrule on the right and a weaker lens (larger radius of curvature) in a mating multi-fiber ferrule on the left which causes the beam to diverge as it exits the lens;

DETAILED DESCRIPTION OF THE PREFERRED EMBODIMENTS

Figure 1:
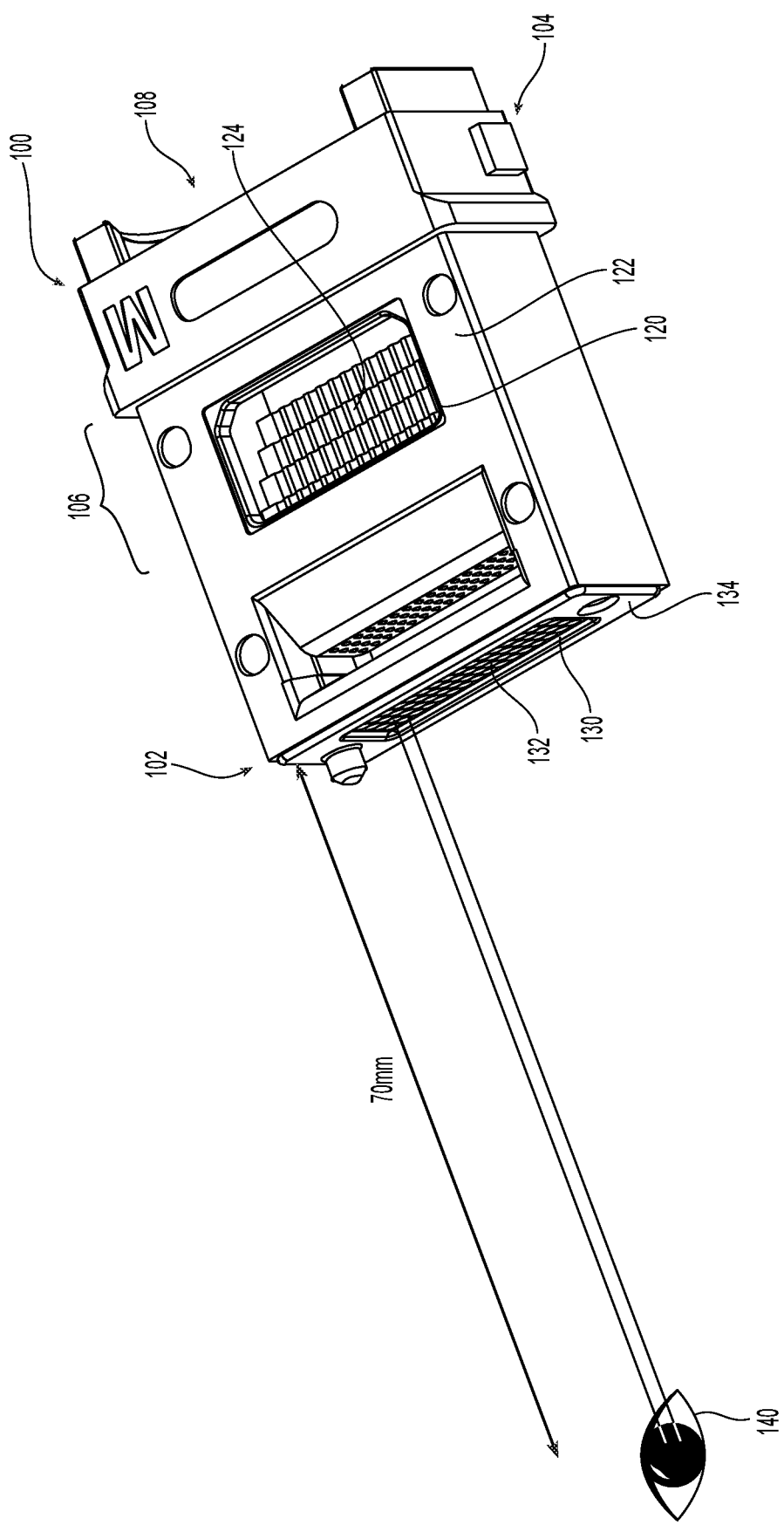
FIG. 1 is schematic diagram of a multi-fiber ferrule with an eye at one of the two distances used in measuring the laser beam hazard.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, in order to understand the reasons for the present invention, a diagram that presents a visualization of how measurements are taken under the current eye safety standards, a multi-fiber ferrule 100 is illustrated. The multi-fiber ferrule 100 maybe any multi-fiber ferrule, including a ferrule according to the present invention as disclosed herein. The details of a multi-fiber ferrule using lenses at the front end can be found in applicant's co-pending application Ser. No. 14/211,480, the contents of which are incorporated herein by reference. As a brief description of the multi-fiber ferrule 100, the unitary body preferably has a front end 102, a back end 104, and a middle portion 106 disposed between the front end 102 and the back end 104. The multi-fiber ferrule 100 is a preferably a unitary ferrule, that is, a single integral element that is preferably molded at the same time from a homogeneous material. The multi-fiber ferrule 100 has a first opening 108 adjacent the back end 104 to receive optical fibers therein. The multi-fiber ferrule 100 may also have an opening 120 from the top surface 122 of the multi-fiber ferrule 100 that is in communication with the first opening 108 to inject epoxy to secure optical fibers within the multi-fiber ferrule 100. A plurality of micro-holes 124 extend through the middle portion 106 to hold and position optical fibers inserted into the first opening 108. The micro-holes 124 are preferably chamfered.

The front end 102 has a recessed portion 130 with a plurality of lenses 132 visible therein. The plurality of lenses 132 are preferably set back from the front face 134 of the front end 102 and are precisely positioned to be in optical alignment with the plurality of micro-holes 124 (and the optical fibers inserted therein). Preferably, the number of lenses 132 corresponds to and are in individual alignment with the number and position of the micro-holes 124. The plurality of lenses 132 are molded with the rest of the optical ferrule 100 and are generally a collimating-type lens. That is, the lenses 132, because they are in contact with air in the recessed portion 130, are collimating due to the difference in the index of refraction between the polymer and the air and the shape of the lens. The light exiting from the optical fibers inserted into the multi-fiber ferrule 100 passes through the lenses 132 and is then collimated into a near-parallel light beam to be received by lenses of an identical, mated multi-fiber ferrule, which then focus the received light onto the ends of the optical fibers in that multi-fiber ferrule. It is anticipated that the front face 134 of the multi-fiber ferrule 100 makes physical contact with the front face of another multi-fiber ferrule.

When determining if a particular device meets the requirements for eye safety, measurements of the light are taken 70 mm away from the front face 134 fiber-optic ferrule. Since the pupil in a human eye 140 is about 7 mm in diameter, the light entering a 7 mm aperture at 70 mm from the front of the multi-fiber ferrule is measured. This generally approximates the amount of light that would be entering the human eye. The present invention is directed to a multi-fiber ferrule that reduces the amount of light that can reach the eye.

Figure 2:
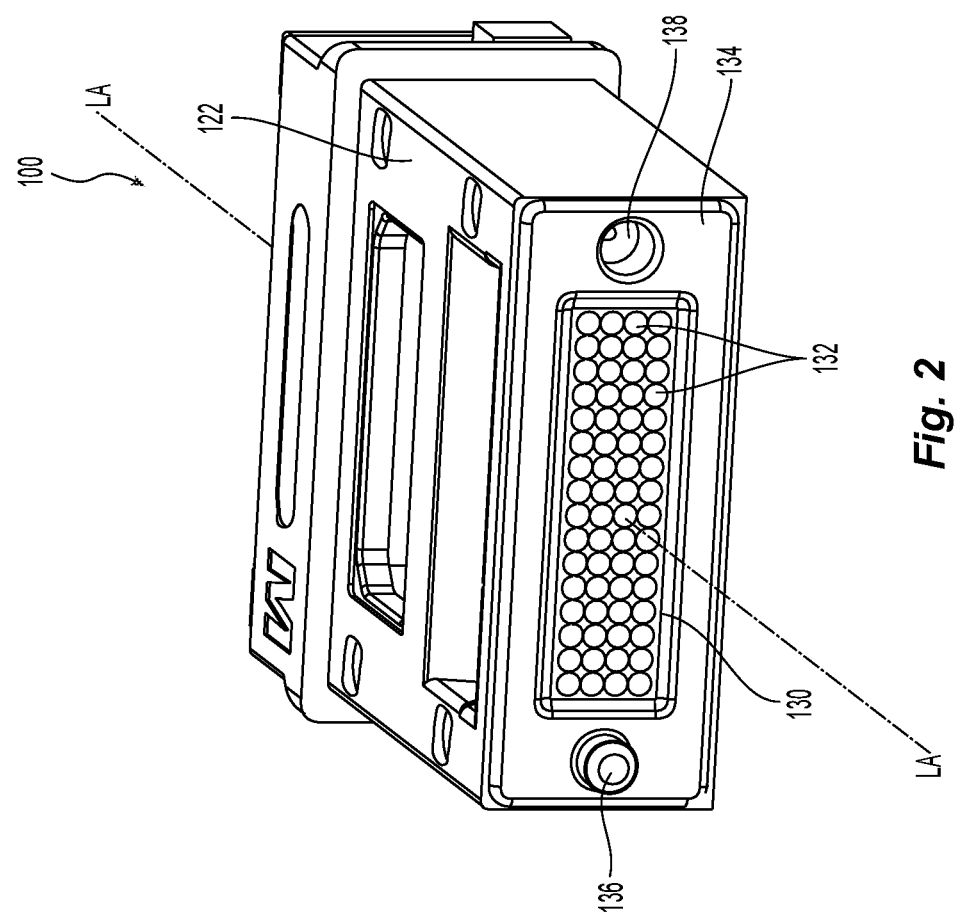
FIG. 2 is a front perspective view of a lensed standard multi-fiber ferrule with 64 fibers and lenses.

FIG. 2 is front view of the multi-fiber ferrule 100. The multi-fiber ferrule 100 accommodates up to 64 optical fibers (not shown). The ends of the optical fibers are disposed within the multi-fiber ferrule 100, each positioned behind one of the lenses 132, the lenses 132 being exposed at the front end 102 of the multi-fiber ferrule 100. The lenses 132 each have a prescription that causes the light exiting from the multi-fiber ferrule 100 to be collimated and exiting at a perpendicular angle to the front face 134 of the multi-fiber ferrule 100.

As illustrated in FIG. 3, which schematically represents two lenses 132 in two mated multi-fiber ferrules, the lenses 132 are shaped to allow the light L to be collimated as it exits the multi-fiber ferrule 100 (or focuses the light on the end of the optical fiber 116 for the receiving lens). In this manner, the multi-fiber ferrules are bidirectional, allowing the light path to be either right-to-left or right-to-left in FIG. 3.

Returning to FIG. 2, the multi-fiber ferrule 100 may have an integrally molded guide post 136 on one side and a guide post opening 138 on the other side. When two multi-fiber ferrules 100 are mated to one another, the guidepost 136 of one of the multi-fiber ferrules 100 aligns with guide post opening 138. Thus, the multi-fiber ferrules 100 are mated with the top surfaces 122 aligned with one another. As can be realized, if the second multi-fiber ferrule was not present, the collimated light would be able to travel a long distance. Given that the 16 lenses on each row extend about 4 mm across, they will certainly be contained within the 7 mm aperture discussed above. As a result, it would be preferable to block the light, spread it out so it is not so intense, or direct the light so that it does not travel straight out of the multi-fiber ferrule 100. However, each of these solutions interferes with the mating of the multi-fiber ferrules and maintaining an acceptable insertion loss across the mating junction.

Illustrated in FIG. 4 is a left lens 150 that has a weaker prescription than the right lens 152. The right lens 152 has a smaller radius of curvature (ROC) and a stronger prescription than that of lens 132 and the left lens 150 has a ROC that is larger than lens 132. In this way, the light exiting the lens 150 will be more spread out than the light leaving lens 152. If the light leaving lens 150 is diverging as it leaves the multi-fiber ferrule 100, then the intensity at 70 mm is dramatically reduced from the collimated beam exiting lens 132. Further, if the light exiting lens 152 unblocked, then the rays will cross and diverge before the 70 mm distance is reached. However, aligning the multi-fiber ferrule with the lens 150 having a larger ROC will require a more exact (a tighter) alignment with a multi-fiber ferrule having the lens 152 than the mating illustrated in FIG. 3. The multi-fiber ferrule pair illustrated in FIG. 4 will still be bi-directional. With the two different prescriptions, it will be necessary to have two separate multi-fiber ferrules—one with lenses 152 and one with lenses 150 (not preferred) or the lenses of the multi-fiber ferrule will have to be placed so that when the multi-fiber ferrules are mated, the corresponding lenses are matched. This arrangement is discussed below in more detail.

Figure 5:
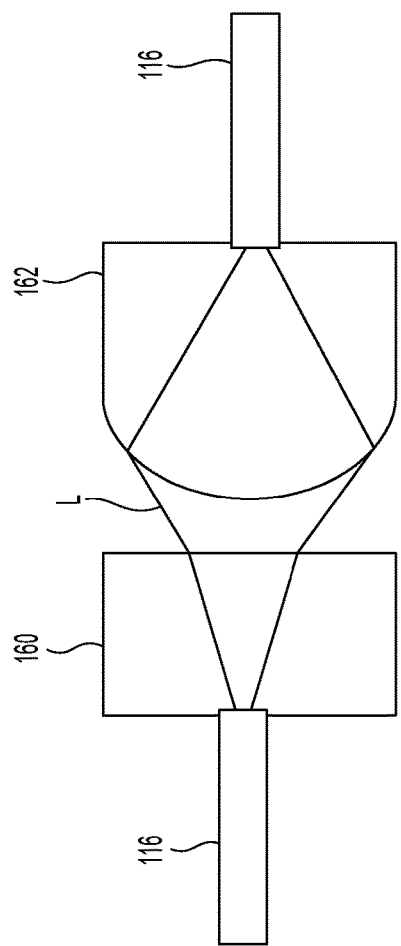
FIG. 5 is a schematic diagram of one lens in a standard multi-fiber ferrule on the right and a flat lens (smaller power) in a mating multi-fiber ferrule on the left, also causing divergence of the beam.

In another embodiment in FIG. 5, a lens 160 is matched with a lens 162. The lens 160 is a flat lens, having an essentially infinite ROC. In this case, all of the prescription power is in lens 162. Lens 160 causes the light L to diverge to an even greater degree than lens 150 discussed above. This divergence of the light L reduces even further the possibility of intense light entering an eye. Due to the increase in divergence of the light L, the alignment must be still greater than that of the lenses in FIGS. 3 and 4.

Figure 6:
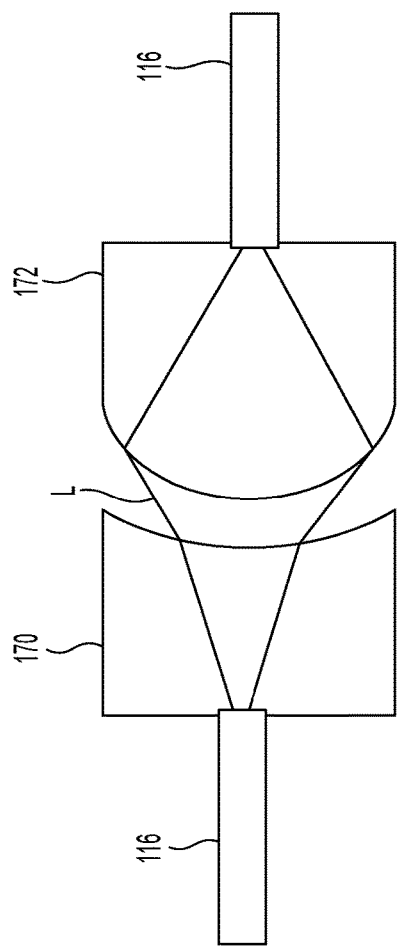
FIG. 6 is a schematic diagram of a lens in a standard multi-fiber ferrule on the right and a concave lens in a mating multi-fiber ferrule on the left.

In yet another embodiment in FIG. 6, a lens 170 is matched with a lens 172. The lens 170 is a concave lens, causing even more divergence of the light L. With the greatest amount of divergence of the light L of the lenses disclosed above, the alignment of the two lenses illustrated in FIG. 6 is most critical.

Figure 7:
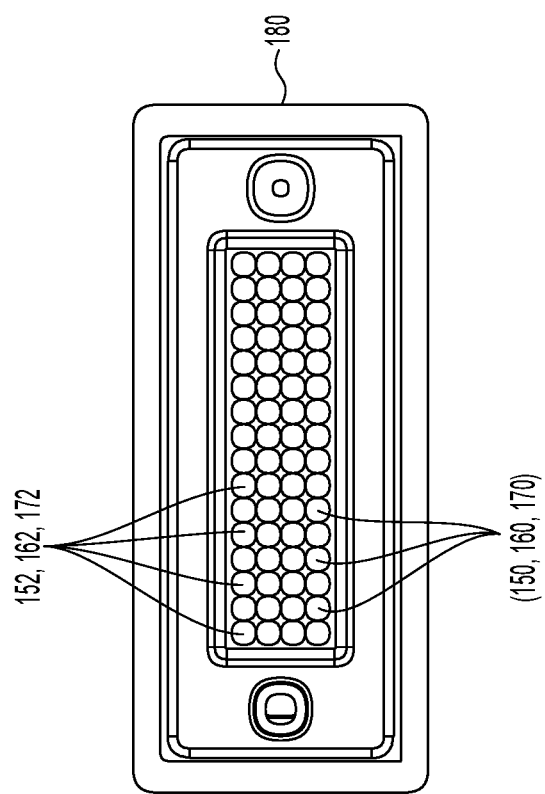
FIG. 7 is illustrates one embodiment of a multi-fiber ferrule using the different lens prescriptions to reduce the number of collimated beams that exit the multi-fiber ferrule.

FIG. 7 illustrates the front face of a multi-fiber ferrule 180 using the lenses discussed above. Since the object is to manufacture only one multi-fiber ferrule 180 for the technicians in the lab or factory (or even the technicians in the field) that can be used on both sides, the two multi-fiber ferrules 180 need to match when they aligned and mated as discussed above: top surfaces are on the same side of the mated pair. However, in order to be able to so mate the multi-fiber ferrules, the lenses having one prescription in the multi-fiber ferrule 180 need to be arranged so that they are aligned with lenses having another prescription. One arrangement would be to alternate the prescription in the columns of the lenses. For example, the odd columns (looking from the front towards the back of the multi-fiber ferrule (as illustrated in FIG. 7) are (from left to right) the first, third, fifth, etc. columns and would have a first prescription (that of lenses 132 for example) and then the even columns would have a different prescription (e.g., that in lenses 150, 160, 170). When two such ferrules are mated, then the lenses would be mated with a corresponding prescription as noted above. This would reduce the light reaching the 7 mm aperture at 70 mm and protect the user's eyes.

Figure 8:
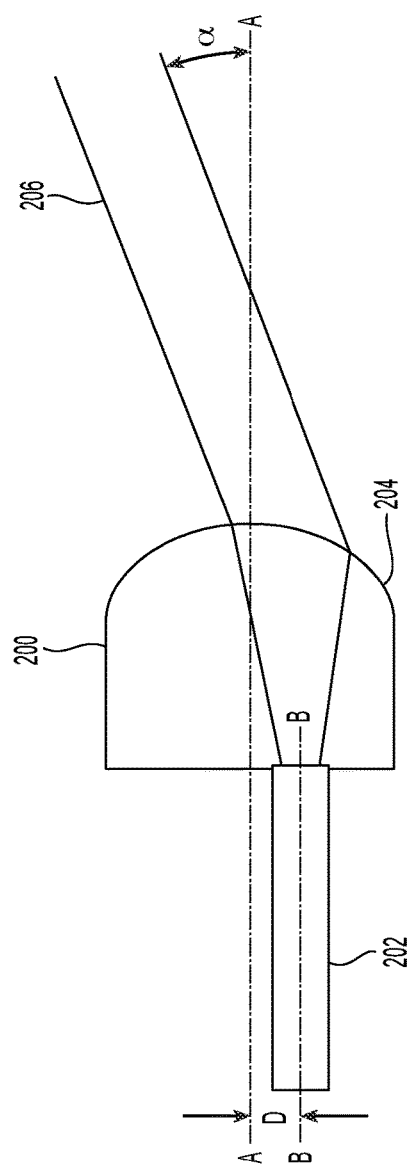
FIG. 8 is a schematic diagram of an optical fiber offset from an optical axis on a lens in a multi-fiber ferrule according to another embodiment of the present invention.
Figure 9:
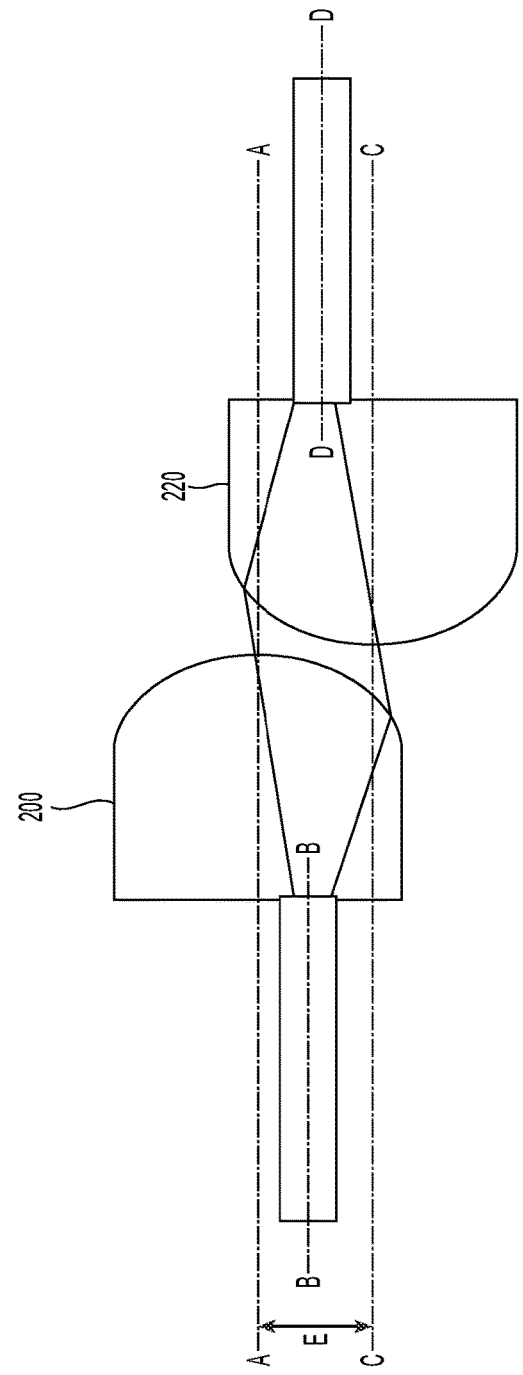
FIG. 9 is a schematic diagram of a launching lens and a receiving lens with the offset optical fibers from FIG. 8 in two mated multi-fiber ferrules.
Figure 10:
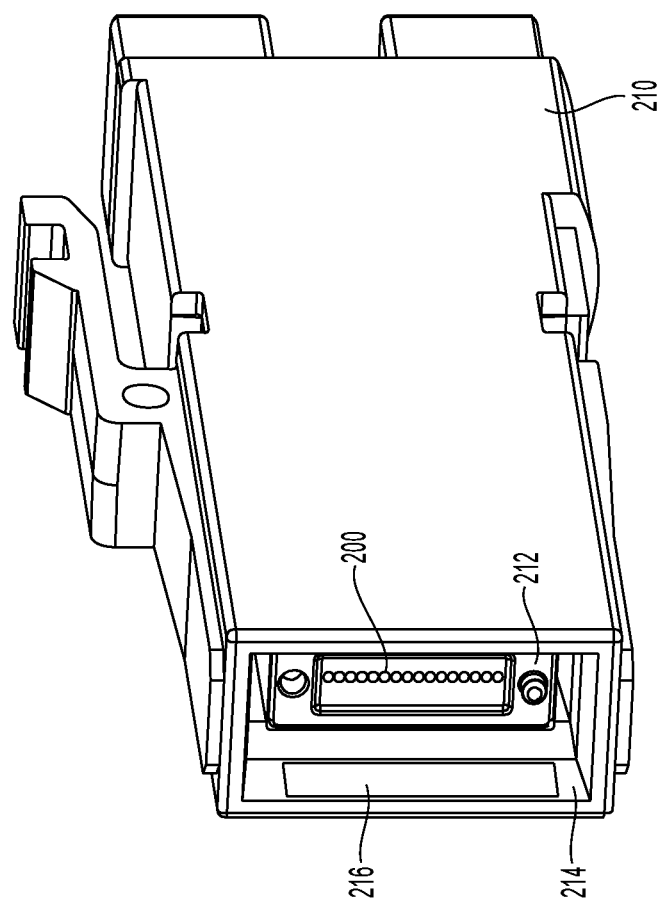
FIG. 10 is a front right perspective view of a fiber optic connector with a multi-fiber ferrule having offset optical fibers relative to the lenses and directing the beam into the connector.

Another approach to affecting the beam of light exiting from a multi-fiber ferrule is illustrated in FIGS. 8-11. FIG. 8 schematically illustrates a lens 200 that is optically off centered from an optical fiber 202. The lens 200 has an optical axis A-A, noting that the lens has a spherical outer surface 204. However, the lens 200 may also be aspherical or biconic to achieve the same effect. The optical fiber 202 has a fiber axis B-B that is normally aligned with the optical axis of the lens 200. See, e.g., FIGS. 3-6. It should be noted that the fiber axis B-B also corresponds to an axis of the micro-holes (or optical fiber openings) 124. As is known in the art, the micro-holes 124 are only slightly larger than the optical fibers making the longitudinal axis of each of the micro-holes co-axial with the fiber axis B-B that are inserted into the multi-fiber ferrules. The distance of offset D determines the angle ∝ at which the beam 206 exits from the lens 200 relative to the optical axis A-A. Preferably, the angle ∝ is between 10 and 30°. Alternatively, the shape of the lenses could be designed with a non-radially symmetric form, whereby the light would exit at an angle relative to the axis of the fiber. With the beam 206 exiting at an angle ∝, the beam 206 is directly into a structure associated with multi-fiber ferrule, i.e., a connector housing, adapter, etc. For example, as illustrated in FIG. 10, there is a connector housing 210 (also referred to as a plug) that accepts a multi-fiber ferrule 212 with the lenses 200. The connector housing 210 could be, as one embodiment, the MXC design supplied by applicant, US Conec. Because the multi-fiber ferrule is in a recessed position (does not extend outside the connector housing), a light absorbing material 216 could be disposed on an inside surface 214 of connector housing 210. The light absorbing material 216 could be a black flock cloth or other light absorbing material. Alternatively, the inside surface 214 of the connector housing 210 can simply be a dark, but non-reflecting surface.

FIG. 9 illustrates how lens 200 mates with a lens 220 from a multi-fiber ferrule on the other side. The lens 220 has an optical axis C-C that is offset by a distance E from the optical axis A-A of lens 200. The lens 220 is also offset from the fiber axis D-D (or the optical fiber opening in a corresponding multi-fiber ferrule). This arrangement also allows the multi-fiber ferrules to be bi-directional.

Figure 11:
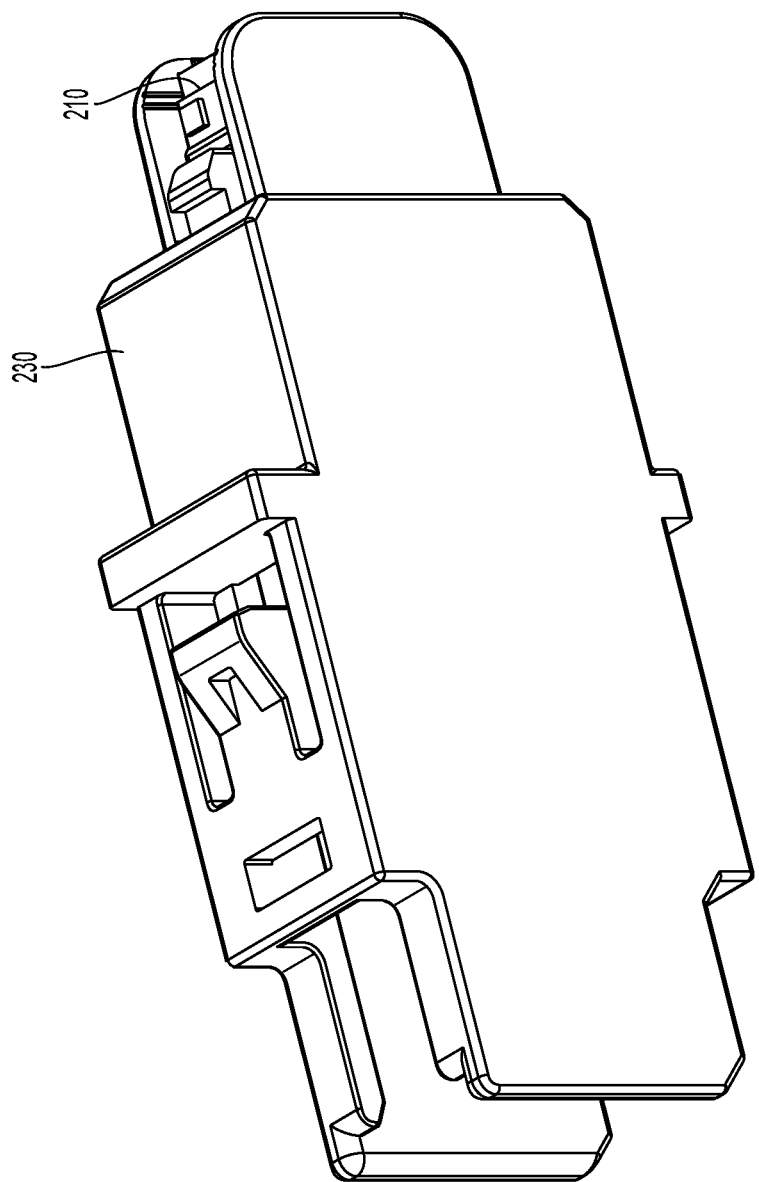
FIG. 11 is a top perspective view of a receptacle that has the fiber optic connector of FIG. 10 installed therein, the multi-fiber ferrule being recessed within the receptacle.
Figure 12:
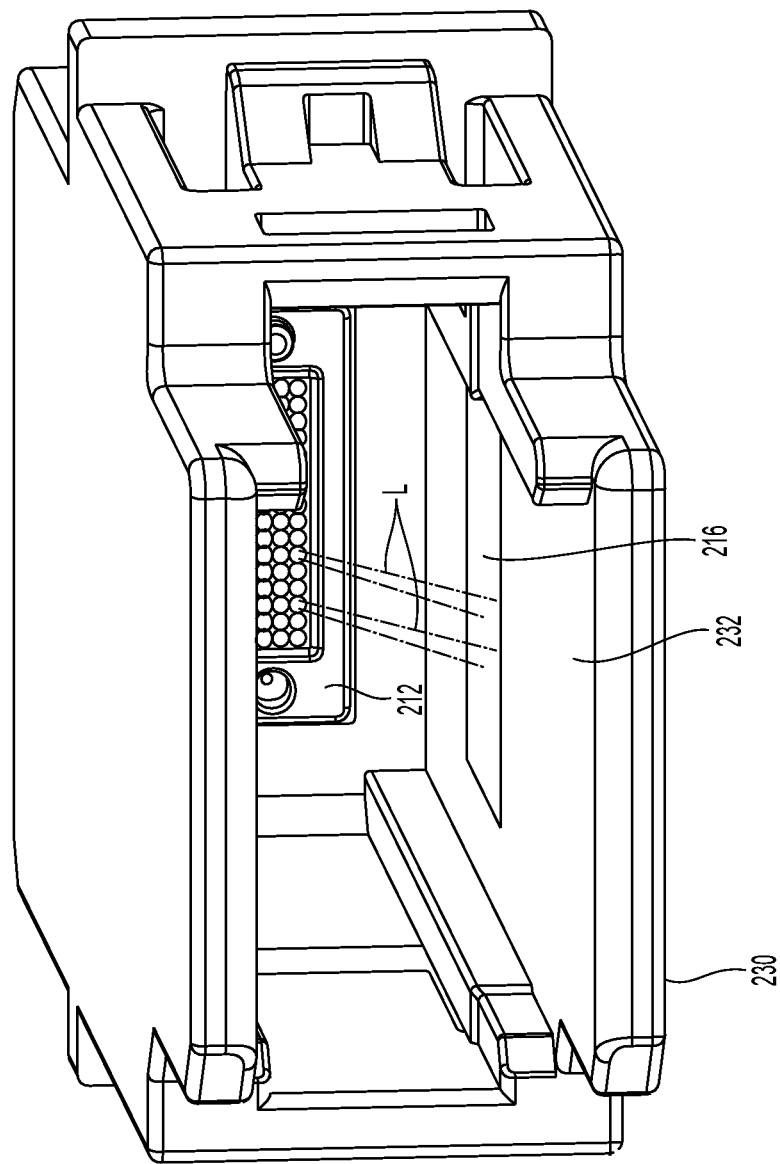
FIG. 12 is a front view of the receptacle of FIG. 11, illustrating the multi-fiber ferrule inserted into the receptacle and the light absorbing material in the receptacle.

The connector housing 210 is inserted into the receptacle 230 illustrated in FIG. 11. The connector housing 210 is inserted into the receptacle 230 from the right side. Since the multi-fiber ferrule 212 is recess relative to the connector housing 210, which is also recessed relative to the receptacle 230, the light absorbing material 216 could also be dispose on the inside surface 232 of the receptacle 230. Naturally, the light absorbing material 216 would be placed at a location on the inside surface 232 as dictated by the angle of the light beams L exiting the multi-fiber ferrule 212.

Figure 13:
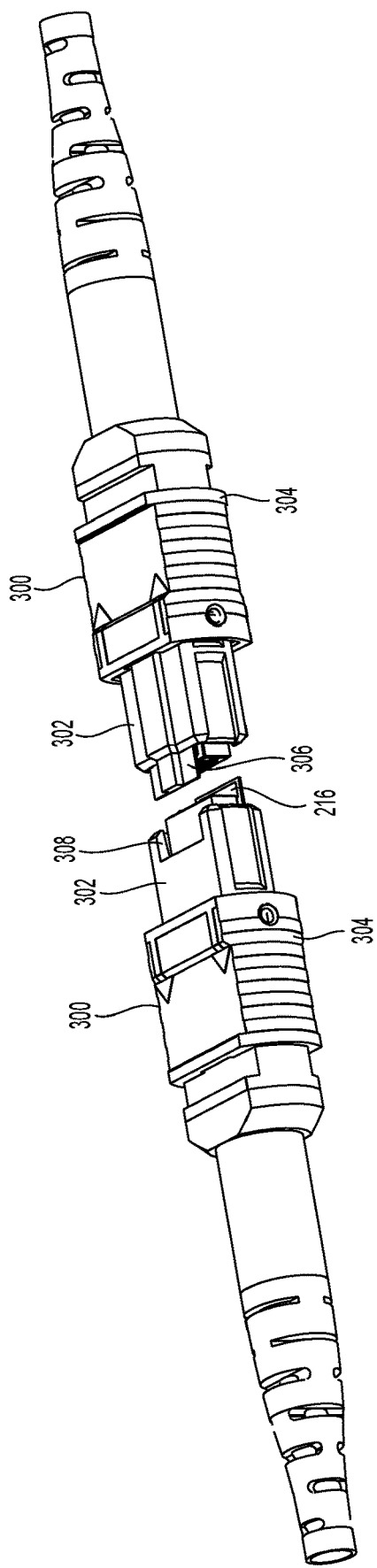
FIG. 13 is a top perspective view of two MTP connectors using the light absorbing material along with MT multi-fiber ferrules having lenses offset from the optical fiber axis and directed into absorbing material on the inner housings thereof.

FIG. 13 illustrates two MTP connectors 300 prior to mating using a ferrule with the offset axis from above. As is known in the art, MTP connectors have an inner housing 302 as well as an outer housing 304. In order to use the present invention with the MTP connector 300, the inner housing 302 will have a protruding portion 306 on one side and a corresponding recessed portion 308 on the other side. The protruding portion 306 will have the light absorbing material 216 on an inside surface to receive the light emitted from the multi-fiber ferrule in the MTP connector. Because the multi-fiber ferrules engage one another in a mated condition, and the portion 306 must extend beyond the front of multi-fiber ferrule to catch the laser beams, there must be a corresponding recessed portion 308 to receive the protruding portion 306 when mated.

Figure 14:
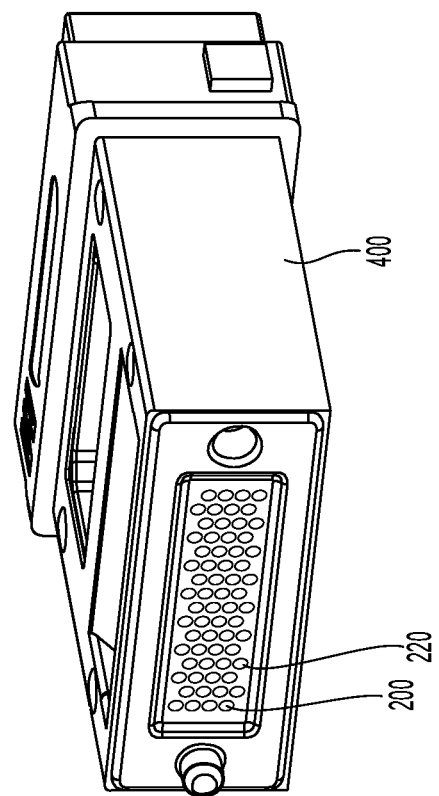
FIG. 14 is a front perspective view of another multi-fiber ferrule according to the present invention that requires only one the multi-fiber ferrule be molded.

FIG. 14 illustrates a multi-fiber ferrule 400 that has lenses 200,220 to implement the offset axes of the optical fiber openings and the lenses. As with the embodiment in FIG. 7, the lenses 200 would be in the odd columns and the lenses 220 would be in the even columns (or vice-versa) so that only one multi-fiber ferrule would have to be manufactured to achieve the goal described herein. Since the lens axis is offset from the optical fiber openings, one of the two will have to be moved relative to the other. It is easier to move (mold) the lenses in a different location than it is to move the optical fiber openings. As will be realized, the molding of the lenses in the front of the multi-fiber ferrule 400 is relatively simple as compared to moving the pins that form the optical fiber openings in the mold.

Applicant notes that the half of the lenses in the multi-fiber ferrule 400 would cause the light exiting to go upwards and half of the lenses cause the light to go downwards (to the top of the page in FIG. 14 and the bottom of the page, respectively).

Figure 16:
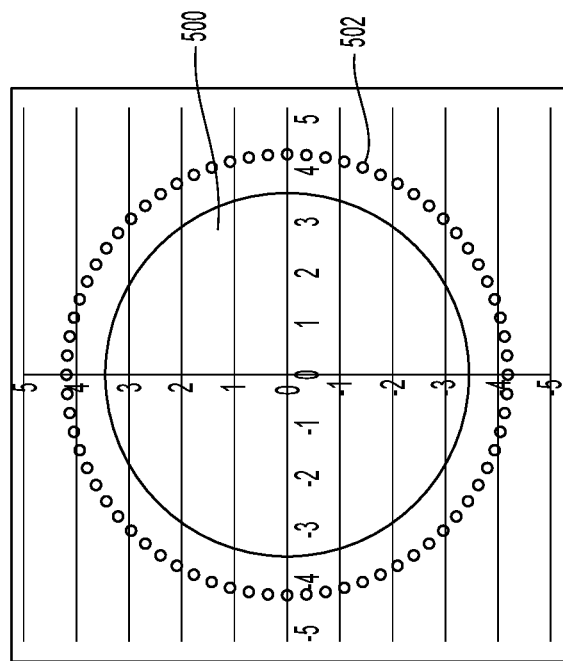
FIG. 16 is an illustration of the beams from a multi-fiber ferrule with an offset causing as little as a 3.6-degree redirection of the laser beam to eliminate about 75% of the laser beams that could be in the 7 mm area.
Figure 15:
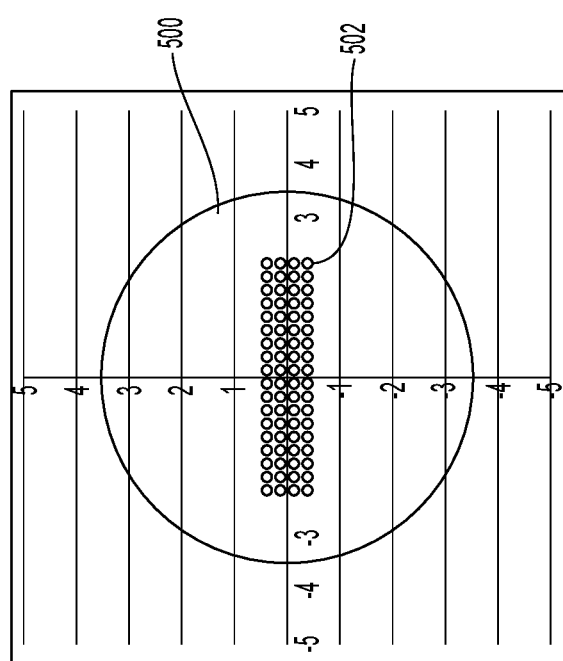
FIG. 15 is a schematic illustrating the alignment of the current lens design at 70 mm in a 7 mm area.
Figure 17:
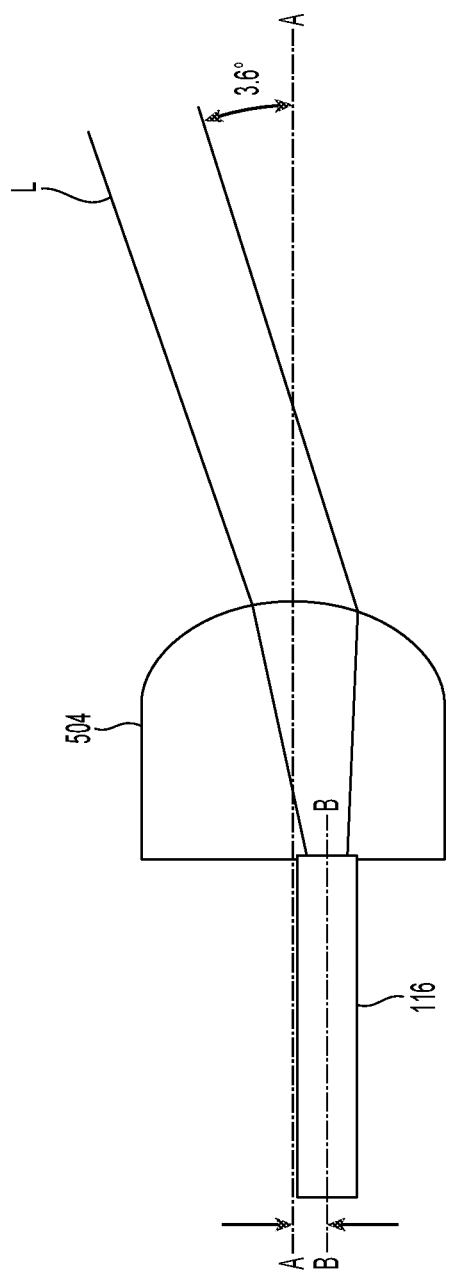
FIG. 17 is a schematic of the lens and optical fiber alignment to achieve the redirection of the laser beams in FIG. 16.

FIG. 15 illustrates the principles noted above with regard to the collimated beams and the spacing at 70 mm from the front face of a multi-fiber ferrule. The circle 500 represents a 7 mm aperture (equivalent to the pupil of a human eye) and the 64 small circles 502 represent the spacing of the light beams from the multi-fiber ferrule. As is clear, the collimated light beams from a highly collimated multi-fiber ferrule fit within the 7 mm aperture. Another option to direct the light out of the 7 mm aperture is to cause the light beams to be radially distributed in a circular pattern that is larger than the 7 mm aperture. In FIG. 16, the lenses 504 have been offset from the optical fiber openings (or fiber axis) by about 3.6°. See FIG. 17 where the lens 504 with optical axis A-A is offset from the optical fiber axis B-B of optical fiber 116 to cause the light beam L to be directed at an angle of 3.6° from the optical axis A-A. This offset causes the light beams to be radially offset into a circle that has a 4.4 mm radius, which means that no more than about a quarter of the light beams 502 would be able to be fit within the circle 500 at any one time. To achieve a perfect circle as illustrated in FIG. 16, most of the lenses would have a different angle (and thus offset between the lens and the optical fiber openings). Naturally, the mating ferrules would have to be designed to receive the light and direct it to the ends of the optical fibers.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:
1. An optical fiber connection system comprising:
a structure having a front end, a back end, an inside surface extending between the front end and the back end defining an opening in the structure;
a multi-fiber ferrule configured to be inserted into the opening of the structure, the multi-fiber ferrule comprising:
a main body having a front end, a back end, and a middle portion disposed between the front end and the back end, the back end configured to receive at least two optical fibers;
a plurality of optical fiber structures extending from the back end toward the front end, each of the plurality of optical fiber structures configured to receive an optical fiber and having an axis extending longitudinally therethrough; and
a plurality of lenses disposed in the main body, each of the plurality of lenses being in optical alignment with a respective one of the plurality of optical fiber structures, each of the plurality of lenses having an optical axis such that light incident on the plurality of lenses is directed to the inside surface of the structure after collimation from the plurality of lenses.

2. The optical fiber connection system of claim 1, wherein the structure is a connector housing.

3. The optical fiber connection system of claim 1, wherein the structure is an adapter.

4. The optical fiber connection system of claim 1, wherein the structure includes light absorbing material disposed therein and upon which the light exiting the plurality of lenses falls.

5. The optical fiber connection system of claim 1, wherein the plurality of lenses is disposed in a row with each of the plurality of lenses in the row having a prescription different from an adjacent one of the plurality of lenses.

6. The optical fiber connection system of claim 1, wherein the multi-fiber ferrule is disposed at least partially within the structure.

7. The optical fiber connection system of claim 1, wherein the back end comprises a first opening through which the at least two optical fibers are inserted into the multi-fiber ferrule.

8. The optical fiber connection system of claim 1, further comprising an additional multi-fiber ferrule configured to mate with the multi-fiber ferrule within the structure such that the light reaches the additional multi-fiber ferrule when mated within the structure and when unmated the light falls on the inside surface of the structure.

9. The optical fiber connection system of claim 1, wherein the main body of the multi-fiber ferrule is a unitary main body.

10. An optical fiber connection system comprising:
a mated pair of multi-fiber ferrules including a first multi-fiber ferrule mated to a second multi-fiber ferrule within a structure, each of the first multi-fiber ferrule and the second multi-fiber ferrule comprising:

a main body having a front end, a back end, and a middle portion disposed between the front end and the back end, the back end configured to receive at least two optical fibers;

a plurality of optical fiber structures extending from the back end toward the front end, each of the plurality of optical fiber structures configured to receive an optical fiber and having an axis extending longitudinally therethrough; and a plurality of lenses disposed in the main body, each of the plurality of lenses being in optical alignment with a respective one of the plurality of optical fiber structures, each of the plurality of lenses having an optical axis such that light incident on the plurality of lenses is directed to the inside surface of the structure after interaction with the plurality of lenses when the first multi-fiber ferrule and the second multi-fiber ferrule are unmated, and when mated the light travels between the first multi-fiber ferrule and the second multi-fiber ferrule.

11. The optical fiber connection system of claim 10, wherein the structure is a connector housing.

12. The optical fiber connection system of claim 10, wherein the structure is an adapter.

13. The optical fiber connection system of claim 10, wherein the structure includes light absorbing material disposed therein and upon which the light exiting the plurality of lenses falls.

14. The optical fiber connection system of claim 10, wherein the plurality of lenses is disposed in a row with each of the plurality of lenses in the row having a prescription different from an adjacent one of the plurality of lenses.

15. The optical fiber connection system of claim 10, wherein the multi-fiber ferrule is disposed at least partially within the structure.

16. The optical fiber connection system of claim 10, wherein the back end comprises a first opening through which the at least two optical fibers are inserted into the multi-fiber ferrule.

\* \* \* \* \*